United States Patent [19]

Neel et al.

[11] Patent Number: 4,933,199
[45] Date of Patent: Jun. 12, 1990

[54] PROCESS FOR PREPARING LOW OIL POTATO CHIPS

[75] Inventors: Donald V. Neel; Richard B. Reed, both of Lewisville, Tex.

[73] Assignee: Frito-Lay, Inc., Dallas, Tex.

[21] Appl. No.: 305,256

[22] Filed: Feb. 1, 1989

[51] Int. Cl.$^5$ .............................................. A23L 1/217
[52] U.S. Cl. .................................... 426/438; 426/455; 426/637
[58] Field of Search ............... 426/637, 438, 441, 455, 426/465, 808, 804

[56] References Cited

U.S. PATENT DOCUMENTS

| | | | |
|---|---|---|---|
| 2,611,705 | 9/1952 | Hendel | 426/438 |
| 3,244,538 | 4/1966 | Kaehler | |
| 3,353,962 | 11/1967 | Smith | |
| 3,402,049 | 9/1968 | Mancuso et al. | |
| 3,436,229 | 4/1969 | Simpson | 426/438 |
| 3,708,311 | 1/1973 | Bolton et al. | 426/438 |
| 4,277,510 | 7/1981 | Wjcklund et al. | 426/414 |
| 4,366,749 | 1/1983 | Caridis et al. | 426/438 X |
| 4,537,786 | 8/1985 | Bernard | 426/438 |
| 4,721,625 | 1/1988 | Lee et al. | 426/438 |
| 4,738,193 | 4/1988 | Benson et al. | 99/404 |
| 4,749,579 | 6/1988 | Haydock et al. | 426/242 |
| 4,756,916 | 7/1988 | Dreher et al. | 426/302 |

FOREIGN PATENT DOCUMENTS

| | | |
|---|---|---|
| 1034035 | 6/1966 | United Kingdom . |
| 1133929 | 11/1968 | United Kingdom . |
| 151049 | 7/1978 | United Kingdom . |

Primary Examiner—Arthur L. Corbin
Attorney, Agent, or Firm—Thomas P. Schur

[57] ABSTRACT

A novel process and apparatus is disclosed for producing potato chip products having less than twenty-five weight percent oil based on the total weight of an unseasoned chip. The process requires parfrying potato slices, dealing and partially dehydrating the slices with superheated steam and then further dehydrating the slices.

20 Claims, 2 Drawing Sheets

PROCESS FOR PREPARING LOW OIL POTATO CHIPS

FIELD OF THE INVENTION

The present invention relates to novel low oil potato chip processing and equipment therefor. More specifically, the present invention relates to a multistep process and apparatus whereby partially fried potato slices are de-oiled and dehydrated to yield low-oil potato chips.

BACKGROUND OF THE INVENTION

Potato chips are popular snack items that typically are prepared by frying potato slices in hot oil until the moisture content of the slices is reduced to about two percent by weight or less. Fried potato chips prepared using conventional methods may have an oil or fat content of from about 29 to about 44 percent by weight.

In recent years, a significant consumer interest has developed in weight control and reduced intake of fats and oils. Because of the high fat or oil content of conventionally prepared potato chips, a substantial portion of the total calories therein present derives from the fat or oil in the product.

In response to this consumer interest, potato chip manufacturers have sought to produce a potato chip which retains the flavor and texture characteristics of conventional potato chips, but with a significantly reduced fat content.

One example of low fat potato chip processing is taught in British Patent Specification No. 1,519,049 entitled "Improvements in or Relating to Methods and Apparatus for the Preparation of Deep-Fried Sliced Potatoes, So-called Potato Crips." This reference discloses frying potato slices in a manner wherein the frying oil temperature to which the slices are exposed is either maintained at a constant value or is increased during frying, afterwhich the fried potato slices are exposed to superheated steam to de-oil the slices.

U.S. Pat. No. 4,537,786, entitled "Method of Preparing Low Oil Fried Potato Chips" discloses partially frying potato slices to a moisture content of between 3 and 15 weight percent, and then employing hot air blasts at between 250° F. and 350° F. to reduce the oil content of the par-fried potato slices while also finish-drying the slices to a moisture content of below two weight percent to produce low oil potato chips.

U.S. Pat. No. 4,721,625 entitled "Process for Preparing Low Oil Potato Chips" instructs the reader to par-fry potato slices to a moisture content of ten to twenty-five weight percent, then to de-oil the slices in the presence of saturated steam blasts, and finally to dry the de-oiled slices with superheated steam; all processing occurring in an essentially oxygen free (<300 ppm) environment to yield low oil potato chips. This disclosure notably emphasizes the need to conduct all of the post-frying processing in an essentially oxygen free atmosphere.

Still other proposals for reducing the amount of oil in potato chips include British Patent Specification No. 1,133,929 for a method of making potato chips by frying potato slices at about 300° F. to remove part of the aqueous moisture, and finish drying the slices in dry air at subatmospheric pressure; U.S. Pat. No. 3,353,962 for frying slices to partially remove the aqueous moisture, and finish drying the slices with radiant energy; British Patent Specification No. 1,034,035 for frying potato slices to partially remove the aqueous moisture, and thereafter finish drying the chips in a layer with hot air moving upwards through the layer at low velocity; U.S. Pat. No. 3,402,049 for preparing low fat potato chips wherein raw potato slices are soaked in an edible fat, the fat is drained, and the potato slices are subjected to an elevated temperature to surface-fry and dehydrate the potato slices; and U.S. Pat. No. 4,277,510 for exposing both surfaces of monolayered potato slices to contact with a gaseous atmosphere under drying conditions to reduce the aqueous moisture content of the slices to about 30-65% by weight, contacting the partially dried potato slices with steam under conditions that avoid rehydration of the slices, and frying the steam-treated potato slices to provide potato chips of relatively low oil content.

Additional proposals for processing low oil potato chips are known to those familiar with the art. Still, despite the numerous proposals for reducing the oil content of potato chips, low oil potato chips prepared using previously known processes often have one or more drawbacks that may include undesirable texture, flavor or color characteristics and shortened shelf-life. Also, the previously known processes for preparing low oil potato chips generally are not economically feasible for large scale commercial potato chip production. Accordingly, there remains a need in the art for an economical and efficient process for producing high quality low oil potato chips.

It is therefore one object of the present invention to provide a process for the production of low oil potato chips.

It is another object of the present invention to provide a low oil potato chip process that provides individual control over the processing variables that influence the final product characteristics.

These and other objects of the present invention will become evident to one skilled in the art from the below description of the invention and the appended claims.

SUMMARY OF THE INVENTION

The present invention relates to a process for the continuous preparation of low oil potato chips comprising the steps of:

(a) partially frying potato slices in frying oil such that the frying oil content of the par-fried potato slices ranges from 28 to 40 weight percent and the moisture content of the par-fried potato slices ranges from an average of about four to about ten weight percent based on the weight of the par-fried slices;

(b) de-oiling and partially dehydrating the par-fried slices to a desired oil content of less than twenty-five weight percent based on the total weight of a de-oiled slice having a moisture content of about two weight percent, said de-oiling occurring in a reduced oxygen environment; and (c) dehydrating the de-oiled slices further to produce potato chips having a moisture content of less than about two weight percent based on the weight of the so-formed potato chips.

Preferably the de-oiling is accomplished by the controlled use of superheated steam.

The invention further relates to an apparatus for processing low oil potato chips which apparatus comprises:

(a) means for partially frying potato slices in frying oil to a moistrue content averaging of from about four to about ten weight percent, based on the weight of the par-fried slices;

(b) means for conveying par-fried potato slices from the frying oil to a de-oiling means;

(c) de-oiling and dehydrating means which utilizes superheated steam at temperatures between 149° C. and 171° C., impinging velocities between 488 m/min and 670 m/min and a reduced oxygen environment to remove oil from the par-fried slices such that the slices have an oil content of less than twenty-five weight percent based on the total weight of a de-oiled slice having a moisture content of about two weight percent, and a moisture content of less than about 3.5 weight percent; and (d) dehydrating means to further reduce the moisture content of the par-fried potato slices to less than two weight percent, based on the weight of the de-oiled and dehydrated slices, to form low oil potato chips.

DETAILED DESCRIPTION OF THE INVENTION

In accordance with the present invention there is provided a low oil potato chip process capable of accepting a wide variety of raw potatoes to produce a consistent low fat potato chip product. As used herein, the terms "low fat" and "low oil" are considered to have an equivalent meaning which refers to a potato chip having less than twenty-five weight percent oil based on the total weight of an unseasoned potato chip. The inventive process recognizes that the solids content and reducing sugars of potatoes differ from variety to variety. These characteristics also differ within individual varieties depending on whether the potato is relatively fresh from the ground, commonly referred to as "new crop" potatoes, or whether the potato has been stored for a relatively long period of time, commonly referred to as "storage crop" potatoes. Due to the limited growing season for potato crops, potato chip manufacturers must rely on different varieties, as well as new crop and storage potatoes to meet year-round production requirements. Thus, a manufacturing process must have the inherent ability to accept such varying raw materials and still produce a consistent, high quality product.

In keeping with the present invention, potatoes, peeled or unpeeled, are sliced to a desired thickness and configuration using standard slicing equipment, such as a centrifugal slicer obtainable from the Urschel Company, Valpariso, Indiana. The potato slice may be that of a flat or a corrugated slice. Preferably the slice construction follows the teachings of copending and coassigned U.S. Patent Application Ser. No. 305,225, entitled "Novel Low Fat Potato Chip Constructions", which disclosure is incorporated herein by reference, and is a corrugated chip having an amplitude/period value ranging from 0.35 to 0.50; however, the slice configuration is not a limitation towards practicing the process taught herein.

The present invention employs a fryer, preferably a continuous fryer which may be a single or multiple zone fryer, containing a heated frying medium such as corn oil, soybean oil, partially hydrogenated soybean oil, cottonseed oil, peanut oil, low euricic acid rapeseed (canola) oil and combinations thereof. Means, such as paddle wheels, a submergible conveyor or both, may be provided to transfer the potato slices through the frying medium in a continuous and uniform manner. The frying medium is maintained at a temperature of between about 150° C. and 193° C. (300° and 380° F.). Preferably, the frying medium is maintained at a temperature of from about 160° C. to about 182° C. (320°-360° F.). Generally, the temperature of the frying medium may be maintained about uniform within the fryer or may vary in a manner such that the potato slices are exposed to a gradually decreasing frying medium temperature, such as a temperature profile wherein the potato slices are exposed to a frying medium temperature ranging from an initial temperature of about 171° C. (340° F.) to a final temperature of about 154° C. (310° F.). The temperature of the frying medium has several recognized consequences. First, the efficiency of a fryer increases as higher temperatures are utilized; that is, the ability of a fryer to process more raw material to a given moisture endpoint is increased. Second, the temperature of the frying medium will affect the stability of the medium which may be of major importance if the frying oil recovered later in processing is intended to be recycled. Hence, the optimum frying medium temperature would depend on a balance of the above, as well as other, considerations.

In accordance with the present invention, the potato slices reside within the frying medium until the slices have been partially fried to an average moisture endpoint of between about four and ten weight percent, based on the total weight of the par-fried potato slices. Preferably the slices are par-fried to an average moisture end point of between about 5 and 8 weight percent, based on the total weight of the par-fried potato slices. The dwell time of the potato slices within the frying medium is adjusted based on the potato slice thickness, configuration and solids content so that the desired moisture endpoint is consistently reached. Par-fried potato slices having average moisture contents of between about four and ten weight percent are also characterized as having oil contents ranging from about 28 to about 40 weight percent, based on the total weight of the par-fried potato slices, upon removal from the fryer.

Once the desired par-fried moisture content has been reached, the potato slices are removed from the frying medium and conveyed to a de-oiling unit. The par-fried potato slices are continuously conveyed through the de-oiling unit as a bed of potato slices having a bed depth of between about 2.5 cm and 15 cm (1-6 inches). The bed depth is chosen to provide optimum bed porosity for maximum effective de-oiling. The de-oiling unit is operated to provide optimal de-oiling of the par-fried potato slices without attempting to also optimize the moisture content of the potato slices exiting the de-oiling unit.

The de-oiling unit comprises an enclosed region wherein superheated steam is forced through the bed of par-fried potato slices to strip oil from the potato slices. The temperature in this region is maintained at from 149° C. to 171° C. (300°-340° F.). It has been found that below about 149° C. the par-fried potato slices will not, with reasonable dwell times, be sufficiently de-oiled to yield potato chips having oil contents below 25 weight percent. De-oiling at temperatures greater than about 171° C. will increase the likelihood of producing burnt flavors in the finished product, and so should be avoided. Preferably, the temperature in the de-oiling unit is maintained at about from 149° C. to 166° C. (300°-330° F.). Superheated steam is directed at the potato slice bed at velocities ranging from about 488 m/min to about 670 m/min (1600-2200 ft/min). Preferably, the velocity of the superheated steam ranges from about 549 m/min to 640 m/min (1800–2100 ft/min). The superheated steam may be injected into the de-oiling unit by any known means such as a directed curtain of superheated steam; by a plurality of spaced-apart, directed nozzles; or by injection of steam into a space nearby the bed of potato slices and utilizing heater and blower means to ensure that the steam is superheated and to direct the superheated steam towards the bed of potato slices. Preferably the superheated steam is directed downward at the bed of potato slices and the bed is disposed on a porous conveying means.

It is desirable that the oxygen content in the de-oiling unit be controlled. With the use of superheated steam, oxygen may be maintained at a reduced level, such as at a level of about 14 volume percent or less without significantly affecting the shelf life of the finished products. The reduced oxygen level may be between about 3.0 and 3.5 volume percent of the atmosphere within the de-oiling unit, or as low as about 0.5 volume percent of the atmosphere within the de-oiling unit. A reduced oxygen atmosphere enhances the ability to recover and reuse the oil that is stripped from the par-fried slices since oxidative degradation of the oil is likewise reduced with lesser concentrations of oxygen in the atmosphere. The potato slices are maintained in the de-oiling unit for a time sufficient to reduce the oil content of the slices to less than 25 weight percent based on the total weight of a de-oiled slice having a moisture content of 2 weight percent. The stripped oil is recoverable and may be separated from the aqueous and solid residuals for alternative uses including recycle to the fryer. The residence time of a potato slice in the de-oiling unit is generally from about 30 to about 120 seconds.

The potato slices exiting the de-oil unit are characterized by oil contents of less than 25 weight percent, preferably ranging from 18 to 24 weight percent, and moisture contents ranging from 1.4 to 3.5 weight percent, based on the total weight of the potato slices leaving the de-oiling unit. In accordance with current understandings of potato chip processing, low oil potato chips having moisture contents above about 2.0 weight percent are associated with increased product defects, such as poor texture, clumping and soft centers, and increased staling of the chips. It is also recognized that potato chips having moisture contents below about 0.8 weight percent, while not necessarily exhibiting burnt colors, frequently exhibit burnt flavor notes and are likewise undesirable. Hence, it is desirable that substantially all of the finished moisture distribution of low oil potato chips range between about 0.8 and about 2.0 weight percent. Attempting to de-oil potato slices to produce low oil potato chips and simultaneously arrive at a desired final moisture content has been found to be difficult to achieve in the same unit since optimized de-oiling and optimized final moisture content are not arrived at simultaneously. In accordance with the present invention, the de-oiling unit is employed to obtain optimal de-oiling efficiencies and, it remains necessary to further reduce, and ensure uniformity of, the moisture content of the par-fried and de-oiled potato slices to produce high quality low oil potato chip products.

This further dehydration is accomplished by conveying the bed of par-fried and de-oiled potato slices through a dehydrating unit that is maintained at a temperature of from about 115° C. to about 160° C. (240°–320° F.). A lower dehydration rate is essential in the dehydrating unit to decrease the potential of producing finished potato chips having burnt flavor notes.

The dehydrating unit may be operable with any known methods for reducing the moisture content of the potato slices, such as radiant heat, microwave energy, dielectric drying, forced hot air, and superheated steam.

In one embodiment, the dehydrating unit utilizes superheated steam to further reduce the moisture content of the potato slices. The superheated steam is injected into the dehydrating unit in the form of a directed curtain of superheated steam, or by a plurality of spaced-apart nozzles, or by injection into a space nearby the bed which utilizes blower means to direct the superheated steam through the bed. The superheated steam in the dehydrating unit contacts the bed of potato slices at a velocity ranging from about 30 m/min to about 168 m/min (100–550 ft/min), and preferably at a velocity ranging from about 60 m/min to about 168 m/min (200–550 ft/min).

The oil content of the potato slices is not appreciably reduced by lowering the contact velocities that the slices are exposed to in the dehydrating unit. In one preferred embodiment of the invention, the dehydrating unit employs a multipass design of several tiered conveyors so that the bed is redistributed between tiers to induce still greater uniformity in the resultant potato chip products that exit the unit. The flow of the dehydrating medium may be updraft, downdraft, crossdraft or a combination thereof to the flow of the potato slices passing therethrough.

The potato slices remain in the dehydrating unit until the final moisture content of the so-formed potato chips is uniformly reduced to between 0.8 and 2.0 weight percent, based on the total weight of the so-formed potato chips. Preferably the final moisture content of the potato chips is between about 1.0 and 1.5 weight percent. The residence time of a potato slice in this dehydrating unit generally ranges from about 60 to 180 seconds, varying as a function of the raw material potato characteristics and the slice thickness and configuration.

The fryer, de-oiling unit and dehydrating unit may be integrated, contiguous units or may be separate with the potato slices transferring between these units by conveying means, such as endless belt conveyors. Preferably any conveying means between the fryer and the de-oiling unit and between the de-oiling unit and the dehydrating unit is covered to reduce the exposure of oil to oxygen in the former conveying means, and to retain the heat content present in the potato slices in both the former and latter conveying means.

In one embodiment of the invention, the de-oiling and dehydrating units are contiguous with a barrier separating the two regions and having an opening therethrough, through which the bed of potato slices passes. In another embodiment, the dehydrating unit is distinctly remote from the de-oiling unit.

After the potato slices have been par-fried, de-oiled to reduce the oil content to below twenty-five weight percent based on the weight of de-oiled slices having a moisture content of about 2 weight percent, and dehydrated to a uniform moisture content of less than 2 weight percent based on the weight of the finished potato chips, the so-formed reduced oil potato chips may be salted and seasoned as desired, by means well known to those in the art, and are then ready for immediate consumption or subsequent packaging for later use.

BRIEF DESCRIPTION OF THE DRAWINGS

The present invention will become apparent from the following description thereof when considered together with the accompanying drawings which are set forth as being exemplary of embodiments of the present invention and are not intended, in any way, to be limitative thereof and wherein:

FIG. 1 depicts isobars of constant oil content as a function of the bed depth and dwell time of par-fried potato slices through the de-oiling unit of the subject invention.

The isobars are shown labeled based on weight percent oil of par-fried potato slices exiting the de-oiling unit having a moisture content of about 2 weight percent. The data utilized to generate this figure relied on fixed raw materials, frying conditions, and constant de-oiling unit temperatures and velocities of superheated steam. As can be seen from the Figure, at short dwell times, the par-fried potato slices are not sufficiently exposed to superheated steam to reduce their final oil content to below about 25 weight percent. At high bed depths, the bed of potato slices is too dense to allow overall slice de-oiling that would result in products having oil contents of less than about 25 weight percent.

Figure 1:
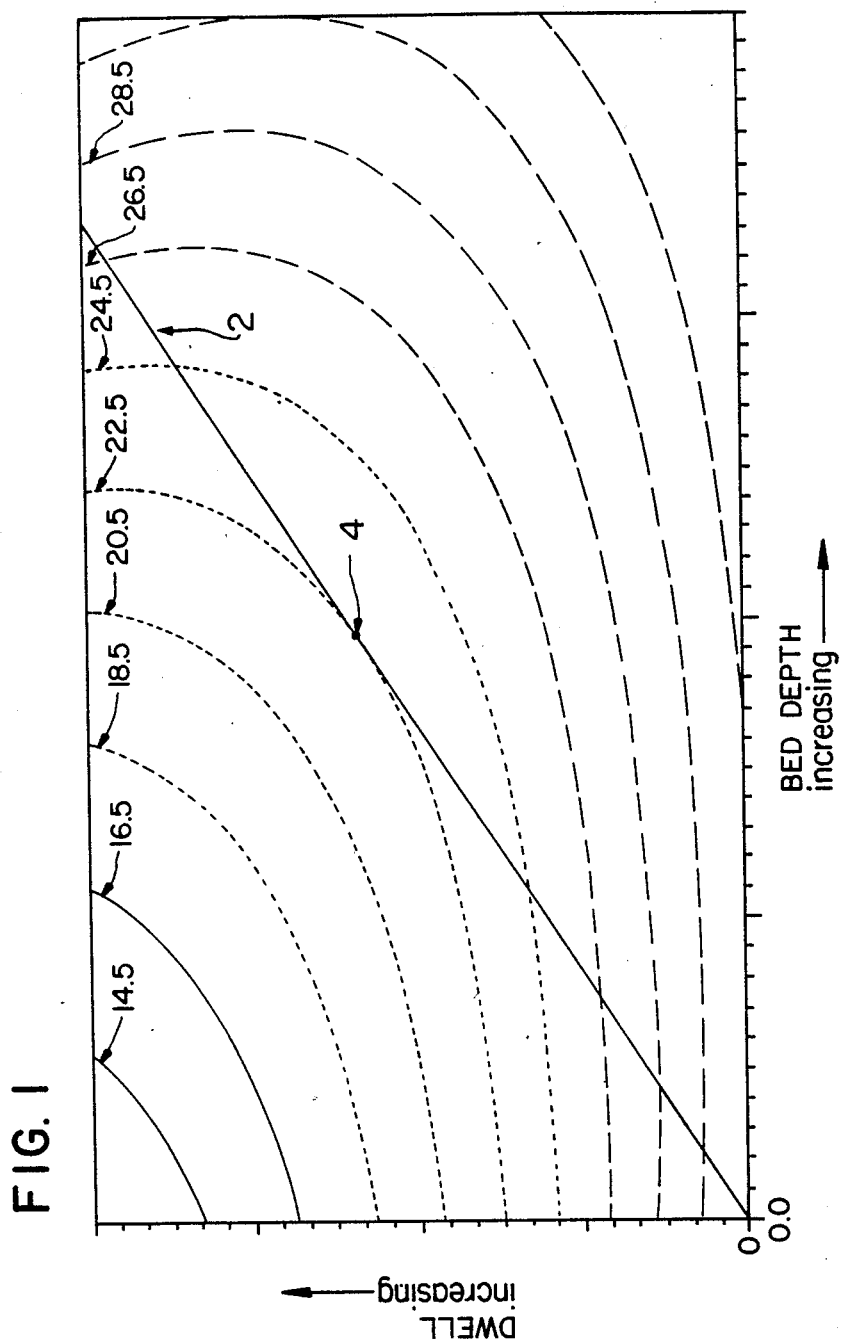
FIG. 1 is a graph of oil content of par-fried and de-oiled potato slices as a function of dwell time and bed depth in the de-oiling unit.

Since the dwell and bed depth are linearly related for a de-oiling unit of fixed length, the operating conditions of a de-oiling unit may be represented in FIG. 1 by a line, identified by the number 2, having a zero intercept and a slope proportional to the length of the unit. The intersect of the operating line and a chosen constant oil isobar, identified in the Figure by the reference number 4 for an oil content of about 22.5 weight percent, specifies the values of dwell and bed depth to obtain the desired oil content. As can be appreciated from the Figure, any deviation of the dwell or bed depth in an attempt to optimize the moisture content of the potato slices exiting the de-oiling unit would be adverse to reaching the chosen oil content of the slices.

Hence, in accordance with the present invention, the de-oiling unit is operated at about its optimum de-oiling performance conditions, and a subsequent dehydrating unit is relied on to achieve the final product moisture in a manner that minimizes products having burnt flavor notes.

Figure 2:
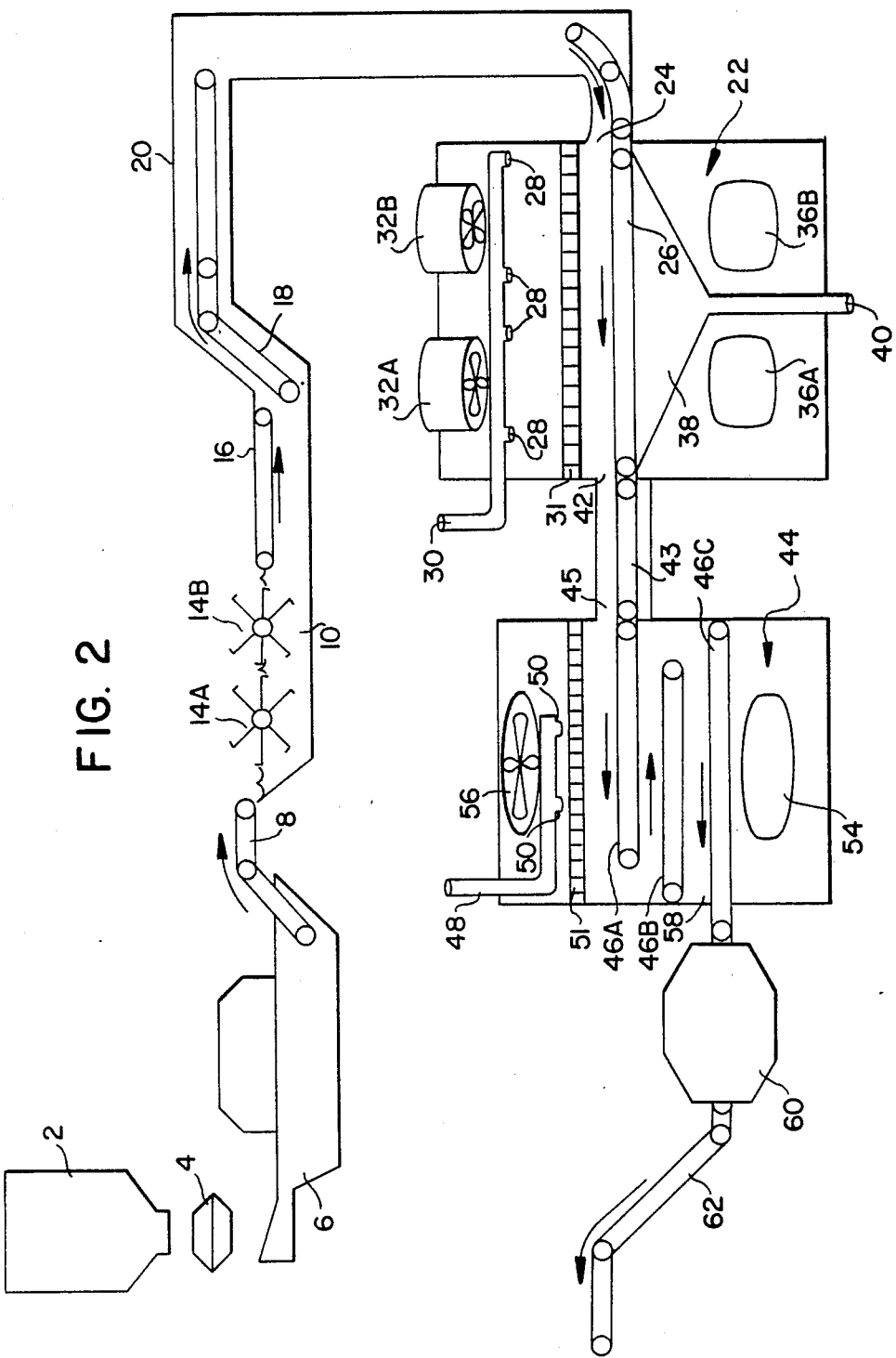
FIG. 2 is a perspective schematic representation of one embodiment of the apparatus of this invention, which includes a continuous fryer, de-oiling unit and adjacent dehydrating unit.

Referring now to FIG. 2, there is shown a schematic representation of an apparatus for producing low oil potato chips in accordance with the present invention.

Whole potatoes stored in hopper 2 are dispensed into a slicing apparatus 4 which drops potato slices into a water wash 6. The slices are removed from the water wash 6 by endless belt conveyor 8 and disposed in frying oil contained within a fryer 10. The frying oil is maintained at a temperature between about 150° C. and 193° C. As shown in this Figure, the fryer is a continuous single-flow fryer which utilizes devices such as paddle wheels, 14A and 14B, and submergible conveyor belt 16 to control the flow of potato slices through the fryer 10. An endless belt conveyor 18 is employed to remove the par-fried slices from the frying oil. Endless belt conveyor 18 is used to route the par-fried potato slices to the de-oiling unit 22. As shown in the Figure, the pathway utilized by endless belt conveyor 18 is covered by a housing 20 to prevent loss of sensible heat from the par-fried slices and to reduce the exposure of the par-fried and oil contained therein to oxidative conditions. The par-fried slices enter a de-oiling unit 22 through opening 24 and pass through the unit on a porous endless conveyor belt 26. In the embodiment shown in this Figure, de-oiling is accomplished by injecting steam through openings 28 in steam delivery means 30 to a headspace above the endless conveyor belt 26. Recirculating Blower means 32A and 32B are shown in the space above conveyor belt 26. The blowers are used to generate a downward superheated steam velocity against the bed of par-fried potato slices traveling through the de-oiling unit 22. Recirculated steam from the blower means 32A and 32B combines with the injected steam and is passed over heating means 31 forming superheated steam which impinges on the par-fried potato slices and strips oil therefrom. Stripped oil is separated and collected by accumulator means 38 and removed through port 40 for recycling into fryer 10, by means not shown in the Figure. The stripped oil may also go through additional clean-up and regeneration equipment prior to return to the fryer 10. Recirculation conduits below the conveyor belt 26 identified as 36A and 36B and shown connected to blower means 32A and 32B, respectively, by means not shown in the Figure return clean, and de-oiled steam to the blower means 32A and 32B above.

Par-fried and de-oiled slices pass through opening 42 in the de-oiling unit 22 and are transferred by a covered endless belt conveyor 43 to the dehydrating unit 44. The slices pass through opening 45 in the dehydrating unit 44 and are thereafter moved therethrough by a series of tiered endless belt conveyors, identified as 46A, 46B, and 46C, respectively, in dehydrating unit 44. Steam is injected through ports 50 in steam delivery means 48 which is shown in the upper portion of the dehydrating unit 44. The steam is intermixed with a recirculating atmosphere within the dehydrating unit 44 by blower means 56 which directs gas downward, past heating means 51 which superheats the steam to between about 115° C. and 160° C., and through conveyor belts 46A, 46B and 46C, respectively, and recirculates the atmosphere through recirculation conduit opening 54 which is connected to blower means 56 by a conduit not depicted in the Figure.

The par-fried, de-oiled potato slices enter the dehydrating unit 44 with a moisture content of generally less than about 3.5 weight percent and exit the dehydrating unit 44 with a consistent, finished moisture content between about 0.8 and 2.0 weight percent.

The de-oiled and dehydrated potato chips exit the dehydrating unit 44 through opening 58 and advance into a tumbler 60 wherein salt and/or seasonings may be added to the potato chips. The seasoned potato chips exit the tumbler 60 on conveyor belt 62 and are transferred to a packaging area, not shown in the Figure where the products are prepared for shipment.

EXAMPLES

The following examples are provided to more fully illustrate the invention and are not intended to be limitative thereof. In these examples, potatoes were cut to form corrugated slices having an amplitude/period value of between 0.35 and 0.50, as taught in co-pending patent application, U.S. Ser. No. 305,225.

The potato slices were disposed in a continuous single-pass fryer that utilized partially hydrogenated soybean oil as the frying medium. The oil temperature was measured to be about 171° C. (340° F.) at the fryer inlet and about 154° C. (310° F.) at the fryer outlet. The potato slices passed through the fryer to achieve an average par-fried moisture content of between about 4 and 10 weight percent. The par-fried slices were then transferred to a de-oiling apparatus. In the de-oiling apparatus, a bed of the par-fried slices, about 5.1 cm (2 in.) thick was subjected to a stream of superheated steam having an impinging velocity of about 549 m/min (1800 ft/min) and a temperature of about 149° C. (300° F.). While in the de-oiling unit the superheated steam uniformly stripped oil from the par-fried slices so as to meet the requirements of a low-oil potato chip, as defined earlier above. The conditions in the de-oiling unit also served to substantially dehydrate the par-fried potato slices. The oxygen level in the de-oiling unit was measured to be between about 3 and 3.5 volume percent during operation. The residence time of a par-fried potato slice in the de-oiling unit was about 60 seconds in all cases, except in the Control. In order to produce a low oil potato chip having a requisite moisture level solely by processing in the de-oiling unit, an unacceptably long dwell time would be required, as demonstrated in the Control run which required a 113 second dwell to reach an average moisture content of about 1.6 weight percent.

RUNS 1–12

In all runs except the Control, the slices exiting the de-oiling unit were fully de-oiled, but had not reached the final moisture level for acceptable potato chips; below two weight percent and preferably between about 1.0 and 1.5 weight percent. The slices were thereafter passed through a dehydrating unit, which utilized heated air to achieve drying. The dehydrating unit relied on a combination of hot air temperature and velocity, as well as slice residence time in the dehydrating unit, to achieve the desired finished product. These dehydrating conditions were varied in Runs 1–12 to demonstrate the effect of these variables on the finished products. The oxygen level in the dehydrating unit was about 21 volume percent during operation.

The average weight percent of oil and moisture in the slices existing the fryer, the de-oiling unit, and the dehydrating unit are shown in Table 1 below. Table 1 also provides details on the dehydrating conditions employed in each run.

As can be seen from Table 1, par-fried slices having oil contents between about 30 and 38 weight percent and moisture contents between about 5.5 and 7.0 weight percent can be de-oiled under the above-stated conditions to yield low oil potato slices having oil contents between about 17.6 and 22.5 weight percent and moistures between 1.5 and 2.8 weight percent. These de-oiled slices may then be gently dehydrated to further reduce the moisture content of the slices without significantly affecting the oil content.

The Dehydrating Conditions shown in Table 1 exemplify the need to adjust the conditions of air temperature, air velocity and slice dwell time to yield optimum finished product. As is evident, the dehydrating conditions of Runs 1–7 yield low oil potato chips having oil contents between 19.8 and 22.3 weight percent and ideal moisture contents between 1.1 and 2.0 weight percent. The dehydrating conditions of Runs 8–9 were performed under more severe conditions and produced finished products having acceptable oil yields, between 20.4 and 22.8 weight percent; but lower than desired moisture levels, between about 0.7 and 0.9 weight percent. Conversely, the less-severe dehydrating conditions employed in Runs 10–12 yielded products having acceptable oil levels, between about 19.8 and 21.9 weight percent; but having unacceptably high moisture levels, between about 2.2 and 2.4 weight percent.

RUNS 13–14

The following example demonstrates the increased control gained by the present inventive process as contrasted to an optimized one-step de-oiling/dehydrating process. In the following runs the fryer and de-oiling units were operated under the earlier described conditions.

TABLE 1

| Run Number | Par Fried Slice Characteristics | | De-oiled Slice Characteristics | | Dehydrating Conditions | | | Dehydrated Slice Characteristics | |
|---|---|---|---|---|---|---|---|---|---|
| | Wt. Percent Oil | Wt. Percent Moisture | Wt. Percent Oil | Wt. Percent Moisture | Temperature (°C.) | Velocity (m/min) | Dwell (sec) | Wt. Percent Oil | Wt. Percent Moisture |
| Control | 35.6 | 4.1 | 21.7 | 1.6 | | | | | |
| 1 | 37.1 | 5.0 | 20.0 | 2.2 | 121 | 54 | 111 | 20.0 | 1.7 |
| 2 | 37.7 | 6.3 | 20.5 | 2.2 | 117 | 84 | 187 | 20.3 | 1.5 |
| 3 | 38.1 | 5.8 | 21.3 | 1.5 | 114 | 76 | 60 | 19.8 | 1.5 |
| 4 | 36.5 | 6.1 | 22.4 | 2.5 | 103 | 30 | 182 | 21.6 | 1.6 |
| 5 | 34.2 | 7.0 | 22.4 | 2.8 | 131 | 38 | 63 | 22.3 | 1.8 |
| 6 | 33.6 | 6.8 | 20.2 | 2.1 | 138 | 168 | 184 | 20.6 | 1.1 |
| 7 | 37.0 | 6.7 | 17.6 | 2.5 | 135 | 51 | 65 | 20.0 | 2.0 |
| 8 | 37.2 | 6.3 | 20.3 | 2.2 | 144 | 61 | 182 | 20.4 | 0.9 |
| 9 | 31.9 | 6.6 | 22.0 | 2.0 | 148 | 91 | 182 | 22.8 | 0.7 |
| 10 | 30.7 | 5.9 | 22.1 | 2.7 | 103 | 101 | 114 | 20.8 | 2.4 |
| 11 | 39.6 | 6.3 | 19.6 | 2.6 | 96 | 45 | 68 | 19.8 | 2.4 |
| 12 | 34.6 | 5.5 | 22.0 | 2.4 | 106 | 53 | 60 | 21.9 | 2.2 |

Run 13 represents a one-step de-oiling/dehydrating process, achieved by utilizing a slice residence time in the de-oiling unit of about 90 sec. In Run 14, the slices passed through the de-oiling unit with a 60 second dwell, and were then transferred to a hot air dehydrating unit. The dehydrating unit was operated in Run 14 at a hot air temperature of about 149° C., air velocity of about 91 m/min, and with a slice residence time of about 120 sec.

The average and standard deviation of moisture and color were measured on the products made in these runs and are reported in Table 2 below. The color measurement is based on the L value derived from the Tri-Stimulus Colorimeter System, Model D 25L, available from Hunter Laboratories, Reston, Virginia. A higher L-value corresponds to a lighter-colored potato chip.

TABLE 2

|  | Run 13 | Run 14 |
|---|---|---|
| Moisture (weight percent) | | |
| Average | 1.52 | 1.46 |
| Std. Dev. | 0.19 | 0.17 |
| Color (L-value) | | |
| Average | 61.6 | 62.3 |
| Std. Dev. | 1.86 | 1.86 |

This data demonstrates three advantages of the inventive process. First, the two-step process of Run 14 provides the ability to dry to a desired mean moisture endpoint in a manner affording much greater control over the final moisture. Second, the inventive process produces products having more uniform final moisture distributions. Third, the average color value of products formed by the process disclosed herein is increased and distinct from the average product color obtained by the one-step process. An additional benefit of the subject invention is the ability to control finished product moisture content independent of the finished product oil content.

The invention disclosed herein provides a novel process and apparatus for producing consistent high quality low oil potato chips that have heretofore been unattainable. It is believed that any of the variables disclosed herein can readily be determined and controlled without departing from the spirit of the invention herein disclosed and described. Moreover, the scope of the invention shall include all modifications and variations that fall within the scope of the attached claims.

We claim:

1. A process for preparing low oil potato chips comprising the steps of:
    (a) partially frying potato slices in frying oil such that the frying oil content of the par-fried potato slices ranges from 28 to 40 weight percent and the moisture content of the par-fried potato slices ranges from about four to about ten weight percent, based on the weight of the par-fried slices;
    (b) de-oiling and partially dehydrating the par-fried slices with superheated steam such that the slices have an oil content of less than twenty-five weight percent based on the total weight of a de-oiled slice having a moisture content of two weight percent, said de-oiling occurring in a reduced oxygen environment; and
    (c) dehydrating the de-oiled slices further to produce potato chips having a moisture content of less than about two weight percent based on the weight of the so-formed potato chips.

2. The process of claim 1 wherein the potato slices are partially fried to a moisture content ranging from an average of about 5 to about 8 weight percent, based on the weight of the par-fried potato slices.

3. The process of claim 1 wherein said de-oiling occurs when the par-fried slices are disposed in a bed having a thickness of between about 2.5 cm and 15 cm.

4. The process of claim 1 wherein said de-oiling is accomplished by directing superheated steam at temperatures of from 149° C. to 171° C. toward the par-fried potato slices at impinging velocities of from 488 m/min. to 670 m/min.

5. The process of claim 1 wherein said de-oiling is accomplished by directing superheated steam at temperatures of from 149° C. to 166° C. toward the par-fried potato slices at impinging velocities of from 549 m/min. to 640 m/min.

6. The process of claim 1 wherein step (b) occurs in a reduced oxygen atmosphere wherein oxygen is present at a level of about 14 volume percent or less.

7. The process of claim 1 wherein step (b) occurs in a reduced oxygen atmosphere wherein oxygen is present at a level between about 3.0 and 3.5 volume percent.

8. The process of claim 1 wherein step (b) occurs in a reduced oxygen atmosphere wherein oxygen is present at a level of about 0.5 volume percent.

9. The process of claim 1 wherein the par-fired slices are de-oiled and partially dehydrated in step (b) for a period of time ranging from about 30 seconds to about 120 seconds.

10. The process of claim 1 wherein said dehydrating in step (c) is accomplished by directing superheated steam at a temperature of from 115° C. to 160° C. and a contact velocity of from 30 m/min. to 168 m/min. toward the de-oiled, par-fried potato slices.

11. The process of claim 10 wherein the contact velocity ranges from 60 m/min. to 168 m/min.

12. The process of claim 1 wherein the potato chips have a moisture content between about 1.0 and 1.5 weight percent, based on the weight of the so-formed potato chips.

13. The process of claim 1 wherein the par-fried, de-oiled slices are dehydrated in step (c) for a peirod of time ranging from about 60 seconds to about 180 seconds.

14. The process of claim 1 including the additional step of recovering the oil removed from the par-fried potato slices in step (b).

15. A process for preparing low oil potato chips comprising the steps of:
    (a) partially frying potato slices in frying oil such that the frying oil content of the par-fried potato slices ranges from about 28 to about 40 weight percent based on the weight of the par-fried potato slices, and the moisture content of the par-fried potato slices ranges from about 5 to about 8 weight percent based on the weight of the par-fried potato slices;
    (b) de-oiling and partially dehydrating the par-fried potato slices with superheated steam maintained at between 149° C. and 166° C., which impinges upon the potato slices at velocities of from 549 m/min. to 640 m/min., such that the slices have an oil content of less than twenty-five weight percent based on the total weight of a de-oiled slice having a moisture content of two weight percent, said de-oiling occurring in a reduced oxygen environment; and
    (c) dehydrating the de-oiled potato slices further to produce potato chips having a moisture content of between about 0.8 and 2.0 weight percent based on the weight of the so-formed potato chips.

16. The process of claim 15 wherein said dehydrating in step (c) is accomplished by directing a dehydrating medium at temperatures of from 115° C. to 160° C. and velocities of from 30 m/min. to 168 m/min. toward the de-oiled, par-fried potato slices.

17. The process of claim 16 wherein said dehydrating medium is superheated steam.

18. The process of claim 16 wherein said dehydrating medium is air.

19. The process of claim 15 wherein step (b) occurs in a reduced atmosphere wherein oxygen is present at a level of about 14 volume percent or less.

20. The process of claim 15 including the additional step of recovering the oil removed from the par-fried potato slices in step (b).

* * * * *